United States Patent [19]

Nelb, II et al.

[11] Patent Number: 5,183,864
[45] Date of Patent: Feb. 2, 1993

[54] POLYAMIDE BLENDS BY REACTIVE PROCESSING

[75] Inventors: Robert G. Nelb, II, Midland, Mich.; Kemal Onder, Lake Jackson, Tex.

[73] Assignee: The Dow Chemical Company, Midland, Mich.

[21] Appl. No.: 558,955

[22] Filed: Jul. 27, 1990

Related U.S. Application Data

[63] Continuation-in-part of Ser. No. 247,789, Sep. 22, 1988, abandoned.

[51] Int. Cl.[5] .............. C08L 77/10; C08L 79/08; C08L 59/02; C08L 69/00
[52] U.S. Cl. .................. 525/452; 525/399; 525/424; 525/426; 525/432; 525/433; 525/436; 525/440
[58] Field of Search ........... 525/424, 432, 436, 452, 525/426, 433, 440, 399

[56] References Cited

U.S. PATENT DOCUMENTS

| | | |
|---|---|---|
| 4,340,697 | 7/1982 | Aya et al. ............ 525/432 |
| 4,420,602 | 12/1983 | Bonk et al. . |
| 4,420,603 | 12/1983 | Nelb, II et al. . |
| 4,497,944 | 2/1985 | Nishizawa et al. ........ 525/436 |
| 4,515,924 | 5/1985 | Brooks et al. ............ 525/432 |
| 4,547,547 | 10/1985 | Chen et al. . |
| 4,579,914 | 4/1986 | Nelb, II et al. . |
| 4,672,094 | 6/1987 | Nelb, II et al. . |
| 4,738,990 | 4/1988 | Nelb, II et al. ............ 521/168 |
| 4,792,590 | 12/1988 | Zecher et al. ............ 525/432 |
| 4,806,589 | 2/1989 | Chen et al. . |

Primary Examiner—James J. Seidleck
Assistant Examiner—Vasu S. Jagannathan

[57] ABSTRACT

Disclosed is a process for the preparation of a thermoplastic polymer blend comprising a first preformed thermoplastic polymer such as a polyester, polycarbonate, ABS graft polymer and the like and a second thermoplastic polyamide or polyamideimide. The second polymer is prepared from a diisocyanate and polycarboxylic compund selected from a dicarboxylic acid, tricarboxylic acid or anhydride thereof, or mixtures of these components by reactively processing the monomer components in the presence of the first polymer.

30 Claims, No Drawings

POLYAMIDE BLENDS BY REACTIVE PROCESSING

CROSS-REFERENCE TO RELATED APPLICATION

This application is a continuation-in-part of copending application, Ser. No. 247,789, filed on Sep. 22, 1988 now abandoned.

FIELD OF THE INVENTION

This invention relates to thermoplastic polymer blends and is more particularly concerned with a process for the preparation of said blends by reactively processing the monomer ingredients of a second polymer component in a first polymer component.

DESCRIPTION OF THE PRIOR ART

A new field of polymer technology has been generated around the concept of blends of two or more different polymer components. This concept has received added interest because of those cases where the blends are possessed of some physical property or set of properties superior to any of the blend's individual components. Another driving force in the study of new blends is the economic one. Oftentimes, a set of desired polymer physical properties can be achieved with a blend wherein a cheaper polymer replaces a substantial portion of a more expensive component. Needless to say, this has led to a wide variety of blends including various types of polyamides or polyamideimides with a variety of thermosetting and thermoplastic polymers such as polycarbonates, ABS, polyesters, polyolefins, polyurethanes, and the like.

More recently, blends based on certain classes of polyamides, polyamideimides, and polyesteramides with polyesters, and other polyamides have been disclosed in U.S. Pat. Nos. 4,547,547: 4,579,914: and U.S. application Ser. No. 83,350 filed Aug. 10, 1987 of common assignee with the present invention. Interestingly, these classes of amide containing polymers while not prepared exclusively from organic polyisocyanates and carboxylic group containing compounds are conveniently prepared via such carbon dioxide evolving methods. The evolution of carbon dioxide from the reaction of each isocyanate group with each carboxylic group, whether it be a carboxylic acid or carboxylic acid anhydride, can create problems particularly if non-solvent or continuous operation is contemplated. Improved procedures for continuous solvent-free and melt polymerization routes to these thermoplastic polyamides and polyesteramides are disclosed in U.S. Pat. Nos. 4,420,602 and 4,420,603. U.S. Pat. No. 4,672,094 discloses a method for increasing the molecular weight of polyamides and polyesteramides which have been prepared via the reaction of diisocyanates with dicarboxylic acid ingredients.

In view of the interest in polymer blends discussed above, and, particularly, some of the polyamide containing blends also noted above, it would be most desirable to have a one-step method for preparing these amide and even amideimide containing polymers in the presence of other preformed polymers. This would eliminate the prior art inconvenience of having to prepare each polymer separately to be followed by the blending operation.

SUMMARY OF THE INVENTION

The present invention is directed to a process for the preparation of a thermoplastic polymer blend containing at least one first thermoplastic polymer and a second thermoplastic polymer having recurring imide and/or amide linkages. The process comprises (a) mixing the first thermoplastic polymer with one or both of the following: an organic diisocyanate and a polycarboxylic compound selected from the class consisting of a dicarboxylic acid, a tricarboxylic acid or anhydride thereof, and mixtures of said dicarboxylic and tricarboxylic acid or anhydride thereof at a temperature below the melting point of the first polymer and (b) reactively processing in the presence of said first polymer at least one organic diisocyanate and a polycarboxylic compound thereby forming said thermoplastic polymer blend.

The term "reactively processing" means essentially melting and mixing the isocyanate and polycarboxylic compound together in the presence of said first polymer.

The term "polycarboxylic compound" as used herein and set forth in the class above means an organic compound inclusive of aliphatic, cycloaliphatic, aromatic and heterocyclic compounds having from 3 to 16 carbon atoms and which contain either two carboxylic acid groups on non-adjacent carbon atoms in the case of dicarboxylic acids or three free carboxylic acid groups or a carboxylic acid and anhydride group formed from two of said acid groups. The latter requires that two of such carboxylic acid groups be on adjacent carbon atoms and therefore capable of forming the carboxylic acid anhydride group. It will be understood by those skilled in the art that the equivalent weight of the polycarboxylic compound will always be the molecular weight of the compound divided by two. That is to say, the tricarboxylic compound or anhydride thereof will have the same equivalent weight relationship with respect to its reaction with the diisocyanate component as does the dicarboxylic acid compound. This relationship follows from the fact that one isocyanate group reacts with one carboxylic acid group to form the carbonamide linkage and carbon dioxide. In the event that a tricarboxylic acid or anhydride thereof is the polycarboxylic compound employed, the anhydride group reacts with isocyanate to form the imide linkage and carbon dioxide, whereas the free tricarboxylic acid counterpart reacts with the isocyanate to form the imide linkage along with carbon dioxide and water.

In spite of the fact that carbon dioxide gas is, and, possibly, water are being evolved in the present process it can be easily carried out in the presence of the first thermoplastic polymer without any adverse effects on either polymer component or on the blend itself.

Surprisingly, even though high melting polymers can be involved, the overall melt blending process can be carried out in many cases at a lower temperature than would be required in the case of the polyamide or polyamideimide alone. For example, the polyadipamides which are generally high melting and difficult to melt extrude, are much more easily prepared and handled at lower temperatures in the presence of an already formed first thermoplastic polymer than they are by themselves.

Accordingly, the present process satisfies the need for the preparation of particular polymer blends. The blends so prepared are easily melt fabricated by extrusion, injection molding, compression molding to produce hose, tubing, wire coating, bushings, seal faces, compressor vanes, impellers, pistons, gears, thread guides, cams, brake linings, clutch faces, abrasives, electrical connectors, automotive parts such as distributor covers, fuel filter bowls, and the like.

DETAILED DESCRIPTION OF THE INVENTION

The process in accordance with the present invention is readily carried out by reactively processing the second thermoplastic polymer forming ingredients in the presence of at least one of the first thermoplastic polymers. Typical first and second polymers will be discussed in detail below. Reactively processing, as defined above, means simply melting and mixing the ingredients for the second polymer, namely the diisocyanate and polycarboxylic compound(s) in the presence of the first preformed polymer. When the term "melting" is used in regard to the polymer forming ingredients, this is not meant to imply the ingredients are melted first or independently of the first polymer melting but to include the ingredients melting in, or dissolving in, the first polymer which is melted or fused.

Accordingly, reactive processing is advantageously carried out at a temperature above the melting point of the first polymer. Generally speaking, the actual temperature will fall within the range of about 100° C. to about 350° C., preferably about 150° C. to about 325° C., most preferably about 200° C. to about 300° C.

The mixing can be carried out by any convenient means for stirring, agitating, compounding, or otherwise mixing viscous ingredients. The combination of mixing and heating such components in accordance with this invention is best described by the art recognized terms of fluxing and homogenizing. The term "fluxing" is used in the general sense known to the polymer art as melting or fusing under some type of mechanical agitation. The term "homogenizing" means the blending together of the recited components so as to form a uniform homogeneous mixture or blend.

Any conventional apparatus for the melt-blending of polymer forming ingredients in any sequence can be employed. For example, the components can be brought together in solid or solid/liquid form and blended using conventional means such as a barrel mixer, a tumble mixer, and the like. Following this, the mixture can then be melt-blended in a resin kettle equipped with heating means and efficient agitation. Alternatively, the components are brought together and fluxed in the appropriate mixing apparatus such as a Banbury type internal mixer, rubber mill, single or twin screw compounder, and the like, where the homogenizing is completed. Preferably, the process is carried out under the exclusion of air and moisture. This is most effectively accomplished by operating under an inert atmosphere of nitrogen, or argon, or other suitable inert gas.

In one preferred embodiment, the components are brought together and processed in an appropriate melt-extruder from which the product is extruded in the form of strands and the like which are then pelletized. Most preferably, the process is carried out in a vented twin-screw extruder. The venting capability is particularly useful in the present process due to the formation of carbon dioxide and possibly water as reaction by-products during the formation of the second polymer The first polymer component which can be employed in accordance with the present process, can include any inert thermoplastic polymer which will melt within the range of from about 100° C. to about 350° C. The term "inert" means that the polymer shall contain no recurring linkages or no substituent groups which will react with isocyanate groups, carboxylic acid groups and carboxylic acid anhydride groups or otherwise interfere with the fluxing and homogenizing of the components when forming the polymer blends. Illustrative but not limiting of suitable thermoplastic polymers are polyamides such as aliphatic and thermoplastic mixed aliphatic-/aromatic copolyamides such as nylon 6, nylon 66, nylon 11, nylon 12, poly(4,4'-methylenebisphenylene azelamide-4,4'-methylenebisphenylene adipamide) copolymer, poly(4,4'-methylenebisphenylene azelamide-4,4'-methylenebisphenylene isophthalamide) copolymer, and the like: polycarbonates prepared typically from dihydroxydiarylalkanes with phosgene or diesters of carbonic acid including those dihydroxydiarylalkanes wherein the aryl groups are substituted with lower alkyl $C_1$ to $C_4$ groups, halogen atoms, and the like, typical of the dihydroxy reactants are bis-(4-hydroxyphenyl) -propane-(2,2) (bisphenol A), bis-(4-hydroxy-3,5 -dichlorophenyl)-propane-(2,2) (tetrachloro-bisphenol A), bis-(4-hydroxy-3,5-dibromophenyl)-propane-(2,2) (tetrabromo-bisphenol A), bis-(4-hydroxy-3,5 -dimethylphenyl)-propane-(2,2) (tetramethyl-bisphenol A), bis-(4-hydroxyphenyl)-cyclohexane-(1,1) (bisphenol Z): and those based on tri-nuclear bisphenols, such as $\alpha,\alpha'$-bis(4-hydroxyphenyl)-p-diisopropylbenzene. Other bisphenols suitable for the preparation of polycarbonates have been described in U.S. Pat. Nos. 3,028,365; 2,999,835: 3,148,172: 3,271,368; 2,970,137: 2,991,273: 3,271,367: 3,280,078: 3,014,891: and 2,999,846, and the like: polyoxymethylenes and blends thereof such as the mixtures of polyoxymethylene with polyurethanes typically disclosed in European Patent Application 117749, and the like: polyesters inclusive of aliphatic, aliphatic-/aromatic, and aromatic polyesters such as the polyalkylene- and polycycloalkylene terephthalates such as polyethylene terephthalate, polybutylene terephthalate, poly(cyclohexylenedimethylene terephthalate), poly(1,4 -phenylene adipate), polybutylene isophthalate, poly(1,4 -phenylene sebacate), and the like: polyurethanes including the aromatic, cycloaliphatic, and aliphatic based thermoplastic polyurethanes as typically disclosed and preparatively taught in U.S. Pat. Nos. 3,642,964; 3,963,679: and 4,376,834, and the like: polyolefins such as high density polyethylene, low density polyethylene, linear low density polyethylene, polypropylene, polybutylene, copolymers of ethylene/propylene, ethylene/butylene, propylene/butylene, and the like; polystyrenes, styrene/butadiene graft copolymers, ABS (acrylonitrile/butadiene/styrene) graft copolymers, and the like; PVC or polyvinyl chloride polymers, chlorinated polyethylenes (CPE), and the like; aromatic polyethers such as poly(phenylene oxide), polysulfone, and the like: polyacrylates such as poly(-methyl acrylate), poly(methyl methacrylate), poly(butyl acrylate), poly(butyl methacrylate), and the like.

A preferred class of thermoplastic first polymers are polyamides, polycarbonates, polyoxymethylenes, polyesters, polyurethanes, polyolefins, polystyrene, polyarylates, ABS graft copolymers, styrene/butadiene copolymers, aromatic polyethers, and mixtures of two or more of the above. Preferred within this group are the polyesters such as the polyalkylene and polycycloalkylene terephthalates as exemplified in polyethylene terephthalate, polypropylene terephthalate, polybutylene terephthalate, polypentylene terephthalate, polyhexylene terephthalate, polyoxydiethylene terephthalate, poly(cyclohexylenedimethylene terephthalate), and the like.

Most preferred species are polyethylene and polybutylene terephthalate.

In respect of typical second thermoplastic polymers having the recurring imide and/or amide linkages and the required diisocyanate and polycarboxylic reactants required therefor, reference is made to the following U.S. patents whose disclosures are incorporated herein by reference: U.S. Pat. Nos. 3,642,715; 4,061,622; 4,061,623; 4,065,441; 4,072,665; 4,087,481; 4,094,864; 4,094,866: 4,115,372; 4,129,715; 4,156,065; 4,501,844; and 4,649,180. The process in accordance with the present invention is particularly adaptable to the thermoplastic polymer forming ingredients disclosed in these incorporated references which in their broadest scope lead to polyamides and polyamideimides.

The organic diisocyanate component includes aromatic, cycloaliphatic, and aliphatic diisocyanates. No particular preference of diisocyanate is called for in respect of the carrying out of the process itself. However, it is those polyamides and amideimides which are derived from aromatic diisocyanates, and, in their preformed condition, which are most difficult to thermally blend with other polymers and for this reason alone a preference for aromatic diisocyanates can be expressed Also, the aromatic diisocyanates are preferred from the standpoint of the ultimate polymer properties desired. Illustrative but non-limiting of the diisocyanates are hexamethylene diisocyanate, 1,3 -cyclohexane diisocyanate, 1,4-cyclohexane diisocyanate, 1-isocyanato-3,3,5-trimethyl-5-isocyanatomethylcyclohexane, 4,4'-methylenebis(cyclohexyl isocyanate), 2,4-, and 2,6-toluenediisocyanate and mixtures thereof, tolidine diisocyanate, dianisidine diisocyanate, methylenebis(phenyl isocyanate) including 4,4'-methylenebis(phenyl isocyanate), mixtures of 4,4'- and 2,4'-methylenebis(phenyl isocyanate), liquefied methylenebis(phenyl isocyanates) prepared in accordance with U.S. Pat. 3,384,653 by heating the diisocyanate with a trialkyl phosphate thereby converting a minor proportion of the isocyanate groups to carbodiimide groups until the isocyanate equivalent weight is from about 130 to about 180, 1,5-naphthalene diisocyanate, and mixtures of two or more of said diisocyanates.

Particularly preferred are 2,4-, and 2,6 -toluene diisocyanate and mixtures thereof, 4,4' -methylenebis(phenyl isocyanate) and liquefied forms thereof, and mixtures of these diisocyanates in any proportion.

The polycarboxylic compound to be reacted with the diisocyanates as defined above includes a broad range of dicarboxylic acids, tricarboxylic acids and anhydrides thereof. The dicarboxylic acids are selected from the group consisting of aromatic dicarboxylic acids, aliphatic dicarboxylic acids, dicarboxylic acid terminated polyesters, dicarboxylic acid terminated polyethers, dicarboxylic acid terminated polycarbonates, and mixtures of any two or more such acids. The less preferred polycarboxylic compounds are tricarboxylic acids or anhydrides and illustratively include 1,2,4 -benzenetricarboxylic acid (trimellitic acid) or trimellitic anhydride, 1,2,3-benzenetricarboxylic acid (hemimellitic acid) or hemimellitic anhydride, and the like. Preferred within the aromatic dicarboxylic acids are isophthalic acid, terephthalic acid, phthalic acid, benzophenone dicarboxylic acid, diphenylene dicarboxylic acids, and the like: preferred within the aliphatic dicarboxylic acids are succinic, adipic, azelaic, pimelic, glutaric, sebacic, decanedioic, dodecanedioic, brassylic acids and the like, and mixtures of any two or more of the above acids can be employed if desired. Most preferred of the monomeric acids are isophthalic, terephthalic, adipic, azelaic, pimelic, glutaric, sebacic, and mixtures of any two or more.

It will be evident to one skilled in the art that when the dicarboxylic acid terminated polyesters, polyethers, and polycarbonates are employed, then the polyamides formed are polyesteramides in accordance with the U.S. Pat. Nos. 4,129,715 and 4,649,180 both cited supra and already incorporated herein. It should be noted that the soft segment polyesters, polyethers, and polycarbonates are linked to the terminal carboxylic acid groups through an ester linkage arising from esterification of the diol groups with a dicarboxylic acid thus the terminology of polyesteramide.

The dicarboxylic acid terminated polyesters, polyethers or polycarbonates are prepared in a variety of known ways. Illustratively, they are obtained by reacting an excess of a dicarboxylic acid, which can be any of those described and identified above including mixtures of two or more of said acids, with a monomeric or polymeric diol. The monomeric diols can be any of those conventionally employed in the preparation o polyester diols. Illustrative of monomeric diols are ethylene glycol, propylene glycol, 1,4-butanediol, 1,2 -hexanediol, 1,5-pentanediol, and the like.

The polymeric diols can be any polyether, polyester or polycarbonate diols having molecular weights within the range of about 400 to about 4000 and disclosed in U. S. Pat. Nos. 4,129,715 and 4,649,180. Illustrative of polyether diols are the poly(alkylene ether) diols obtained by polymerizing one or more cyclic ethers such as ethylene oxide, propylene oxide, butylene oxide, and tetrahydrofuran. The poly(alkylene ether) diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene, and the like and copolymers of said alkadienes with vinyl monomers such as acrylonitrile, methacrylonitrile, styrene, and the like. Particularly preferred polyether diols for use in preparing polyesteramides are poly(tetramethylene glycol) and ethylene oxide capped polypropylene glycols wherein the ethylene oxide content is within the range of about 5 to about 40 percent .

Illustrative of the polyester diols are those obtained by reacting a dicarboxylic acid or mixture of dicarboxylic acids such as adipic, suberic, azelaic, glutaric, 1,12-dodecanedioic acids, and the like, with an excess, over the stoichiometric amount, of a dihydric alcohol such as ethylene glycol, propylene glycol, 1,4 -butanediol, and the like including mixtures of two or more such diols. Preferred polyester diols are the poly(ethylene adipate)glycols, poly(butylene adipate)glycols, poly(ethylene azelate)glycols, poly(butylene azelate)glycols, and the like.

Illustrative of the polycarbonate diols are those obtained by the single ester interchange of alkylene, cycloalkylene, or arylene diols with glycol carbonates. Other preparative methods are disclosed in U.S. Pat. No.

4,649,180. The diols are then reacted with excess dicarboxylic acid as described above.

Two of the most preferred second polymer choices are those polyamides prepared from at least one aromatic diisocyanate and at least one aliphatic dicarboxylic acid and those polyesteramides prepared from at least one aromatic diisocyanate or liquefied form thereof and a dicarboxylic acid mixture comprising an aliphatic dicarboxylic acid and a dicarboxylic acid terminated polyester described above.

Advantageously, the proportions of second polymer forming ingredients employed in respect of each other in the reactive processing step are such that the ratio of equivalents of carboxylic compound (as defined above) per isocyanate equivalent falls within a range of from about 0.95 to about 1.05, preferably from about 0.98 to about 1.02.

The proportions of second polymer forming ingredients, in regard to total second polymer weight percent concentration in the blend, have no specific limitations. Accordingly, the second polymer can comprise from about 5 to about 95 percent by weight of the blend. However, in the interest of obtaining some desirable benefits from the first polymer, the second polymer advantageously comprises from about 5 to about 50, and, preferably from about 10 to about 40 percent.

Advantageously, the polyamides and polyesteramides are prepared in the presence of a catalyst as taught by the patents cited supra. Illustratively, these include alkali metal alkoxides, N-alkali metal lactamates, and the preferred phospholene1-oxides. Said catalysts are generally employed in the amounts of from about 0.001 to about 5 percent by weight of total reactants.

The progress of the second polymer formation, and thus, indirectly, the time for reactively processing its ingredients in the first polymer will depend on a number of factors which can readily be determined. Accordingly, no set time can be delineated to cover all reactive processing conditions. The temperature will play a decisive role in the processing time. Even the means employed for carrying out the process will have a large determinative effect. Generally speaking, the optimum time can be determined by indirect measurements. Such indirect methods include the measurement of carbon dioxide evolved, polymer solution viscosity, melt index by capillary rheometry, rotational viscometry such as measuring the increased torque in stirring the polymer blends (for example as measured in a Brabender Plasticorder) and the like. Therefore, the processing can be continued until the maximum, or, predetermined optimum, of any one of the above measurements is observed.

When the process is being carried out by the preferred means of melt-extrusion involving the fluxing and homogenizing of the components, then the residence time can be controlled by a number of factors. The factors include the extruder conditions of barrel or zone temperatures, the number and geometry of the zones, the rate of propulsion of the mixture through the barrel, the flight of the various conveying or kneading screws, the rate at which it is possible to vent the carbon dioxide, and the like. Oftentimes, the presence of only 0.01 to 0.05 weight percent of a known organic surfactant will facilitate removal of the gas from the processing mixture. While not wishing to limit the present process to any specific time, the advantageous times when operating in the preferred melt-extrusion mode will fall within a range of from about 20 seconds to about 10 minutes, preferably from about 1 to about 8 minutes.

The preferred melt-extrusion method lends itself easily to a continuous procedure, and, accordingly, this embodiment of the present invention is preferred.

The reactive processing method in accordance with the present invention can be carried out in the presence of any additive which may have a beneficial effect on the process itself or which imparts benefits to the final blend. Typical of such additives are antioxidants, wax lubricants, surfactants, pigments, fire retardants, fillers such as talc, calcium sulfate, plasticizers, internal release agents, and the like.

The process in accordance with the present invention provides a facile means for producing blends of polymer components which otherwise are difficult, and, in some cases impossible, to prepare due to the high melting temperatures of the second polymer component. It was noted above when discussing illustrative second polymer forming ingredients that those aromatic polycarbonamide polymers based on aromatic diisocyanates are difficult to melt-blend mainly because of their rather high melting ranges. A typical example is poly(4,4'-methylenebisphenylene adipamide) which is a high melting polymer (about 325° C). The melt blending of this material with other thermoplastic polymers is virtually impossible without resulting in some polymer decomposition or polymer discoloration. Contrastingly, blends of this polymer with other first polymer components are easily prepared without any decomposition using the present method.

Additionally, as noted above, the present invention eliminates the prior art inconvenience of having to prepare each of the polymer blend components separately by preparing one in the presence of the other.

The following examples describe the manner and process of making and using the invention and set forth the best mode contemplated by the inventors of carrying out the invention but are not to be construed as limiting.

EXAMPLE 1

The following experiment sets forth the preparation of a thermoplastic polymer blend by a process in accordance with the present invention.

A master batch consisting of the following ingredients is prepared by mixing together in a beaker at a temperature of about 80° C. to 100° C. 470.5 g of a mixed adipic and azelaic acid terminated polyhexamethylene adipate prepolymer identical to that disclosed in Example 5 of U.S. Pat. No. 4,672,094 and prepared by reacting excess azelaic and adipic acid with a polyhexamethylene adipate glycol (hydroxyl E.W. = 500) to an acid equivalent weight of about 545, 99.2 g of azelaic acid, 1.22 g of 1,3-dimethylphospholene-1-oxide, 3.76 g of Irganox 1098 (an antioxidant supped by Ciba-Geigy Corporation), and 0.61 g of DC-200 (a silicone surfactant supplied by Dow Corning Corporation). The master batch mixture has an observed acid equivalent weight of 304.9.

A 16.5 g (0.0541 eq.) sample of the above molten mixture (at 100° C) is blended with 49 g of dried polyethylene terephthalate pellets (Cleartuf TM 7207CS supplied by Goodyear Chemical) to form a slurry. A 6.9 g (0.055 eq.) sample of molten 4,4-methylenebis(phenyl isocyanate) is added to the slurry and mixed manually for two minutes. Thereafter, the reaction slurry is transferred to the mixing head of a C. W. Brabender Plasticorder maintained at about 260° C. to 265° C. At a rotor speed set at 50 r.p.m. the reaction mixture is thoroughly fluxed and homogenized for about five minutes. The resulting blend is removed from the chamber as an off-white tough polymer containing about 30 weight percent of the polyesteramide obtained from the diisocyanate and the mixture of azelaic acid and mixed adipic and azelaic acid terminated polybutylene azelate in the polyethylene terephthalate.

An infrared absorption spectrum of a compression molded film shows the amide carbonyl absorbance at 1645 cm$^{-1}$.

EXAMPLE 2

This experiment describes the preparation of a thermoplastic polymer blend by a process of the present invention. The procedure is similar to Example 1 except that no master batch is prepared and the carbonamide containing polymer is a straight polyamide rather than polyesteramide.

Accordingly, the following ingredients are added to the Brabender mixing chamber: 67.5 g of polyethylene terephthalate, 4.03 (0.0424 eq.) of azelaic acid, 0.02 g (2 drops) of 1,3-dimethylpholene-1 -oxide, 1 drop of DC-200, and 5.38 g (0.0427 eq.) of molten 4,4'-methylenebis(phenyl isocyanate). The chamber is preheated to 265 to 270° C. and under a rotor speed of 50 r.p.m. The reaction mixture is thoroughly fluxed and homogenized for about five minutes. The resulting blend is removed as an off-white tough polymer containing about 10 weight percent of poly(4,4' -methylenebisphenylene azelamide) in the polyethylene terephthalate.

An infrared spectrum of a compression molded film shows the amide carbonyl at 1645 cm$^{-1}$.

EXAMPLE 3

This experiment describes the preparation of a thermoplastic polymer blend using a process of the invention. The procedure is similar to that set forth in Example 1.

A master batch or molten slurry is prepared by mixing together in a beaker at about 80° C. to 100° C. 20 g of an azelaic acid terminated polybutylene azelate prepared similarly to the one set forth in Example 1 and with an observed acid equivalent weight of 505, 3.47 g of adipic acid, 0.08 g of 1,3-dimethylpholene-1 -oxide, 0.1 g of Irganox 1098 antioxidant, and 1 drop of DC-200. A 16.9 g sample of this molten slurry (at 100° C.) is mixed with 7.92 g (0.0629 eq.) of molten 4,4' -methylenebis(phenyl isocyanate) along with 26 g of polyethylene terephthalate which is then added to 25 g of fluxed polyethylene terephthalate in the Brabender mixing chamber at 280° C. The reaction mixture is fluxed and homogenized at the 280° C temperature for five to six minutes under the conditions set forth above in Example 1. The resulting blend is removed from the chamber as an off-white tough polymer containing about 30 weight percent of the polyesteramide obtained from the diisocyanate and the mixture of adipic acid and azelaic acid terminated polybutylene azelate in the polyethylene terephthalate.

An infrared spectrum of a compression molded film shows the amide carbonyl absorbance at 1645 cm$^{-1}$.

EXAMPLE 4

The following experiment sets forth the preparation of a thermoplastic polymer blend by a process in accordance with the present invention. The procedure is similar to that set forth in Example 1 except as noted below.

A master batch or molten slurry is prepared by mixing together at about 80° C. to 100° C. 435.8 g of the same azelaic acid terminated polybutylene azelate described in Example 3 (acid E.W. = 505), 99.2 g of azelaic acid, 1.22 g of 1,3-dimethylphospholene-1-oxide, 3.76 g of Irganox 1098, and 0.61 g of DC-200. The mixture has an observed acid equivalent weight of 282.

A 16.27 g (0.0577 eq) sample of the above molten slurry (at about 100,C) is blended with 7.27 g (0.0577 eq.) of molten 4,4'-methylenebis(phenyl isocyanate) and 49 g of polybutylene terephthalate (Valox 310 supplied by General Electric Corporation). The mixture is added to the Brabender mixing chamber which is preheated to 260° C. The reaction mixture is fluxed and homogenized at this temperature for five to six minutes under the conditions set forth above in Example 1. The resulting blend is removed from the chamber as an off-white tough polymer containing about 30 weight percent of the polyesteramide obtained from the diisocyanate and the mixture of azelaic acid and azelaic acid terminated polybutylene azelate in the polybutylene terephthalate.

An infrared spectrum of a compression molded film shows the amide carbonyl absorbance at 1645 cm$^{-1}$.

EXAMPLE 5

The following experiment describes the preparation of a thermoplastic polymer blend similar to the one described in Example 2 above except that the polyamide is poly(4,4'-methylenebisphenylene adipamide).

A blend of 31 g of polyethylene terephthalate, 3.30 g (0.045 eq.) adipic acid, 0.05 g. Irganox 1098, 0.03 g (2 drops) of 1,3-dimethylphospholene-1-oxide, and 5.69 g (0.045 eq) of 4,4'-methylenebis(phenyl isocyanate) is mixed thoroughly by hand at a temperature of about 80° C. to 100° C. This slurried blend is added to 32 g of fluxed polyethylene terephthalate in the Brabender mixing chamber already at 280° C. The reaction mixture is fluxed and homogenized at the 280° C. temperature for about seven minutes under the conditions set forth above in Example 1. The resulting blend is removed from the chamber as an off-white tough polymer containing about 10 weight percent of the poly(4,4' -methylenebisphenylene adipamide) in the polyethylene terephthalate.

An infrared spectrum of a compression molded film shows the amide absorbance at 1645 cm$^{-1}$. A differential scanning calorimetry thermogram of the blend has a minor endotherm at 320° C. due to the melting of the polyamide and a larger endotherm at 250° C. due to the melting of the polyester.

EXAMPLE 6

The following experiment describes the preparation of a thermoplastic polymer blend by a continuous process in accordance with the present invention employing a vented twin-screw extruder (Werner and Pfleiderer Model ZDSK28) equipped with six zones or barrel sections.

A master batch is prepared by mixing together at about 80° C. to 100° C. 799.6 g (1.50 eq.) of an azelaic acid terminated polybutylene azelate prepolymer (acid E.W. =533) prepared similarly to those prepolymers described in previous examples, 171.8 g (1.801 eq.) of azelaic acid, 2.10 g of 1,3-dimethylpholene-1-oxide and 6.25 g of Irganox 1098 antioxidant. The master batch has an observed acid equivalent weight of 298.

To 1,500 g of warm polybutylene terephthalate in a one gallon jar is added a 150 g portion of the above master batch. The mixture is tumbled on a jar roller until the pellets are evenly coated and the mixture cooled below its melting point. This pellet/prepolymer mixture has an observed acid equivalent weight of 3262 g.

The six barrel sections of the co-rotating twin-screw extruder are set up with zone 1 as the feed section at ambient room temperature (e.g. 20° C. to 30° C.) and with zones 2, 4, and 6 as conveying zones at 270° C., 246° C, and 248° C, respectively. Zones 3 and 5 are atmospheric venting zones at 270° C and 247° C respectively. The 1/8 inch strand die at the end is at 242° C. A continuous stream of nitrogen purges the feed port and vent sections The screw speed =50 r.p.m. The above pellet/prepolymer mixture is fed to the extruder at a rate of 20 g per minute (0.00613 acid eq./minute) using a gravimetric feeder.

The isocyanate employed is a liquefied one which has been prepared by reacting 4,4'-methylenebis(phenyl isocyanate) in accordance with U.S. Pat. No. 3,384,653 to convert a minor proportion of the isocyanate groups to carbodiimide linkages which latter are in equilibrium with isocyanate to form uretoneimine groups with the resulting isocyanate equivalent weight being about 144. However, its equivalent weight with respect to reaction with earboxylic acid groups is 113 when the carbodiimide function is included in addition to the isocyanate function. The liquefied isocyanate is added to the feed port at a rate of 0.70 g/minute (0.0062 eq./minute).

The torque generated is 550 to 600 inch-lbs. and residence time for the fluxing and homogenizing in the barrel is about 5 minutes. The extrudate is a 10 weight percent blend of the polyesteramide obtained from the diisocyanate and the mixture of azelaic acid and azelaic acid terminated polybutylene azelate in the polybutylene terephthalate and is off-white in color.

An infrared spectrum of the compression molded film shows the amide carbonyl at 1645 cm$^{-1}$.

EXAMPLE 7

The following experiment describes the preparation of a thermoplastic polymer blend by a continuous process in accordance with the present invention employing a vented counter rotating twin-screw extruder (Leistritz LSM30.34) equipped with ten zones or barrel sections. The first two zones are equipped with feed ports at 34° C. and ambient (e.g. 20° C. to 30° C.) temperature, respectively. The following three sections are conveying zones at 247° C., 293° C., and 295° C., respectively. Next zone has an atmospheric vent port and is at 298° C. followed by two conveying zones both at 283° C., a vacuum vent port zone at 281° C. and conveying zone at 276° C. A ⅛ inch strand die at 256° C. is employed. The screw consists of single and triple flighted elements with a shearing disk before the vacuum vent to form a melt seal. A screw speed of 90 r.p.m. is employed.

A K-Tron volumetric feeder is used to feed pellets of polyethylene terephthalate to the first port at 83 g/minute. The pellets had been previously dried at 160° C. for 24 hours in a desiccant bed dryer. A mixture of 4,4'-methylenebis(phenyl isocyanate) flake 1024 8 g (8.13 eq.) and azelaic acid 796.6 g (8.38 eq.) is tumbled until homogeneous and added to the second port using a K-Tron loss-in-weight feeder at a rate of 22 g/minute. At the same time and to the same second feed port, a xylene solution of 0.0199 g of 1,3-dimethylpholene-1-oxide per gram of solution is pumped in at 2.2 g/minute (or 0.044 g of catalyst/minute). The xylene is removed from the polymer melt through either or both vent ports. The residence time for fluxing and homogenizing in the barrel is about 4 minutes. The extrudate is an 18 weight percent blend of the poly(4,4'-methylenbisphenylene azelamide) in the polyethylene terephthalate and is off-white in color.

A DSC thermogram of the extrudate using a Mettler TA3000 with DSC cell and 20° C./minute heating rate shows a melting endotherm at 255° C. and a smaller endotherm of 285° C. for the polyamide component.

What is claimed is:

1. A process for the preparation of a thermoplastric polymer blend containing at least one first thermoplastic polymer and a second thermoplastic polymer, the second thermoplastic polymer having recurring imide and/or amide linkages which process comprises (a) mixing the first thermoplastic polymer with an organic diisocyanate and a polycarboxylic compound selected from the class consisting of a dicarboxylic acid, a tricarboxylic acid or anhydride thereof, and mixtures of said dicarboxylic and tricarboxylic acid or anhydride thereof at a temperature below the melting point of the first polymer and (b) reactively processing the mixture of step (a) whereby the second thermoplastic polymer is formed by the reaction of the organic diisocyanate with the polycarboxylic compound in the presence of said first polymer thereby forming said thermoplastic polymer blend.

2. The process of claim 1 wherein said reactive processing is carried out in the presence of a catalyst for the formation of said second polymer.

3. The process of claim 1 wherein either or both of the organic diisocyanate and the polycarboxylic compound are mixed with the first polymer prior to the reactive processing.

4. A process according to claim 1 wherein said reactive processing is carried out at a temperature above the melting point of said first polymer.

5. A process according to claim 1 wherein said reactive processing is carried out at a temperature of from about 100° C. to about 350° C.

6. A process according to claim 1 wherein said reactive processing is carried out in the presence of a catalyst for the formation of said second polymer.

7. A process according to claim 6 wherein said catalyst is a phospholene oxide.

8. A process according to claim 1 wherein said reactive processing comprises fluxing and homogenizing said first polymer together with said diisocyanate and polycarboxylic compound.

9. A process according to claim 8 carried out in a melt-extruder.

10. A process according to claim 8 carried out in a vented twin-screw extruder.

11. A process according to claim 1 wherein the proportions of said second polymer forming ingredients are such that the ratio of equivalents of carboxylic compound per isocyanate equivalent is from about 0.95 to about 1.05.

12. A process according to claim 1 wherein the proportions of said second polymer forming ingredients are such that said second polymer comprises from about 5 to about 50 percent by weight of the polymer blend.

13. A process according to claim 1 wherein said second polymer comprises the product of reactively processing at least one aromatic diisocyanate or liquefied form thereof with a dicarboxylic acid selected from the group consisting of aromatic dicarboxylic acids, aliphatic dicarboxylic acids, dicarboxylic acid terminated polyesters, dicarboxylic acid terminated polyethers, dicarboxylic acid terminated polycarbonates and mixtures of any two or more such acids.

14. A process according to claim 1 wherein said second polymer comprises the product of at least one aromatic diisocyanate and at least one aliphatic dicarboxylic acid.

15. A process according to claim 1 wherein said second polymer comprises the product of at least one aromatic diisocyanate or liquefied form thereof and a dicarboxylic acid mixture comprising an aliphatic dicarboxylic acid and a dicarboxylic acid terminated polyester.

16. A process according to claim 1 wherein said first polymer is selected from the group consisting of polyamides, polycarbonates, polyoxymethylenes, polyesters, polyurethanes, polyolefins, polystyrenes, polyacrylates, ABS graft copolymers, styrene/butadiene copolymers, aromatic polyethers, and mixtures thereof.

17. A process according to claim 1 wherein said first polymer is a polyalkylene terephthalate.

18. A process for the preparation of a thermoplastic polymer blend comprising a first thermoplastic polymer and a second thermoplastic polymer characterized by recurring amide linkages which process comprises:
(A) adding to the feed zone of a vented twin-screw extruder the components comprising:
(a) said first thermoplastic polymer: and
(b) said second thermoplastic polymer forming ingredients comprising,
(i) at least one aromatic diisocyanate or liquefied form thereof:
(ii) a dicarboxylic acid selected from the group consisting of aromatic dicarboxylic acids, aliphatic dicarboxylic acids, dicarboxylic acid terminated polyesters, dicarboxylic acid terminated polyethers, dicarboxylic acid terminated polycarbonates and mixtures of any two or more such acids wherein the proportions of said (i) and (ii) are such that the ratio of equivalents of carboxylic compound per isocyanate equivalent is from about 0.95 to about 1.05 and that said second polymer comprises from about 5 to about 50 percent by weight of said polymer blend: and
(iii) a phospholene oxide catalyst:
(B) homogenizing said compounds at a temperature below the melting point of the first polymer:
(C) fluxing said compounds at a temperature of from about 100° C. to about 350° C.;
(D) venting the carbon dioxide formed in a vented zone during said fluxing and homogenizing: and
(E) removing the resulting polymer blend from said extruder via a shaping zone.

19. A process according to claim 18 wherein the recited steps are carried out continuously.

20. A process according to claim 19 wherein said first polymer comprises a polyalkylene terephthalate.

21. A process according to claim 20 wherein said first polymer is polyethylene terephthalate.

22. A process according to claim 21 wherein said second polymer is poly(4,4'-methylenebisphenylene azelamide) prepared from 4,4'-methylenebis(phenyl isocyanate) and azelaic acid.

23. A process according to claim 21 wherein said second polymer is poly(4,4'-methylenebisphenylene adipamide) prepared from 4,4'-methylenebis(phenyl isocyanate) and adipic acid.

24. A process according to claim 21 wherein said second polymer is a polyesteramide prepared from 4,4'-methylenebis(phenyl isocyanate) and a dicarboxylic acid mixture of a mixed adipic and azelaic acid terminated polyhexamethylene adipate and azelaic acid.

25. A process according to claim 21 wherein said second polymer is a polyesteramide prepared from 4,4'-methylenebis(phenyl isocyanate) and a dicarboxylic acid mixture of an azelaic acid terminated polybutylene azelate and adipic acid.

26. A process according to claim 20 wherein said first polymer is polybutylene terephthalate.

27. A process according to claim 26 wherein said second polymer is a polyesteramide prepared from 4,4'-methylenebis(phenyl isocyanate) and a dicarboxylic acid mixture of an azelaic acid terminated polybutylene azelate and azelaic acid.

28. A process according to claim 26 wherein said second polymer is a polyesteramide prepared from a liquefied form of 4,4'-methylenebis(phenyl isocyanate) and a dicarboxylic acid mixture of an azelaic acid terminated polybutylene azelate and azelaic acid.

29. The process of claim 1 wherein an organic surfactant is added prior to or during the reactive processing in an amount sufficient to facilitate removal of gas from the processing mixture.

30. The process of claim 29 wherein the organic surfactant is a silicone surfactant.

* * * * *